Patented Dec. 31, 1935

2,026,183

UNITED STATES PATENT OFFICE 2,026,183

MAKING HIGH-CHROME STEEL FROM CHROME-IRON

Lewis B. Lindemuth, New York, N. Y., assignor to Moa Bay Company, New York, N. Y., a corporation of Delaware No Drawing. Application June 13, 1933, Serial No. 675,583

3 Claims. (Cl. 75—45)

Chrome bearing iron has been produced in a blast furnace, containing up to about 4% of chromium from various iron ores which themselves contain chromium compounds.

The present invention provides a process of using such chrome-iron for the production of steels or steel alloys containing fairly high percentages of chromium. In such steels, I include chrome-nickel steels and various other so-called stainless steels containing chromium.

The ore is first treated in the usual way in the blast furnace to produce the chrome-iron. The chrome-iron is then blown in a basic lined Bessemer converter. The blow is continued three or four minutes after the drop of the flame until the chromium in the iron is reduced to a much smaller percentage. Starting with chrome-iron containing 2% to 4%, the blow must be continued until the chromium content is reduced to less than 0.25%.

It is important to use a basic lined converter in order to avoid large accumulation of silicates in the slag. The chromium removed from the iron is accumulated in the slag in the form of chromium oxides ($Cr_2O_3$) or silicates. This slag is used in the production of high-chrome steel.

A portion of the blown metal and all the slag, containing the chrome oxides, silicates, and so forth, is then transferred to a basic electric furnace. The electric furnace is used because it facilitates operations under non-oxidizing conditions, and the basic lining serves the same purpose. The heat in the electric furnace is continued and reducing agents are added to the slag, such for example as ferrosilicon or aluminum, or both.

The effect of the reducing agent is to deoxidize the chromium oxides and to precipitate the chromium from the slag to the bath. The heat is continued through the time necessary for refining, as in ordinary practice.

The portion of the blown metal brought over with the slag from the converter is that quantity which is calculated to produce the desired chromium content in the steel refined in the electric furnace.

In some cases the pig iron produced from the ore is so high in manganese that the finished steel would contain too high a percentage of this element. In that case the first slag produced in the converter should be removed and the process continued as above described.

The slag produced in the first few minutes of the blow contains most of the manganese which was in the iron, and very little of the chromium. By removing this first slag we have the same conditions in the remaining charge which would have existed with a comparatively low manganese content in the original pig iron.

A specific example of the process is as follows:—

Start with 50,000 pounds of pig iron containing carbon 4%, manganese 0.50%, chromium 3%, silicon 0.50%, and some sulphur and phosphorus. Blow until the charge contains carbon 0.10%, manganese 0.02%, chromium 0.20%, silicon 0.02% (with small quantities of sulphur and phosphorus). The slag will then contain about 240 pounds of manganese, as oxide, and 1400 pounds of chromium, as oxide.

The aim is to produce a stainless steel alloy containing 12% by weight of chromium and not over about 0.60% of manganese. (60 pounds of manganese to 1400 pounds of chromium.) The heat in the electric furnace must, therefore, weight approximately 11,660 pounds. I must, therefore, transfer to the electric furnace 10,200 pounds of converter metal plus the slag. The above slag would add 2% of manganese to the product. I want to limit it to 0.60%. With this material, therefore, I would discard the first slag after three or four minutes blow. Substantially no chromium is oxidized until the silicon and manganese have been eliminated from the charge.

After the discard of the first slag, the blow is continued two or three minutes after the drop of the flame, making a total of about twenty minutes. The slag will then contain about 60 pounds of manganese to the 1400 pounds of chromium. To this slag I add the 10,200 pounds of converter metal to make the total of 11,660 pounds, stated above.

In the electric furnace the heat is carried on in the usual way. Ground ferrosilicon or aluminum are added in quantity calculated to reduce the chromium oxide and cause the chromium to enter the bath.

The use of the basic converter is important in avoiding the accumulation of chromium silicates in the slag and to avoid a large slag volume, which would render difficult the subsequent alloying and refining operations.

A valuable property of the basic slag is that the chromium oxide therein is much less stable and more easily reduced than it would be in an acid slag. Silicon, such as would occur in acid lined converters, is not needed for fuel. The chromium in the charge acts very effectively as a fuel and could in fact supply all the required fuel for the converter operation.

The importance of the basic lined electric furnace with a non-oxidizing atmosphere is in the fact that we are treating a basic slag, in which the reduction of the chromium oxide is much more effectively performed under basic conditions.

Various additions may be made to the bath and to the converter charge and various modifications of the specific process described may be made by those skilled in the art without departing from the invention as defined in the following claims.

1. The process of producing high-chrome steels which consists in blowing chrome-iron in a basic converter to a point where most of the chromium is accumulated in the slag as oxide and melting and refining under non-oxidizing conditions in a basic furnace a charge consisting of the converted slag and a sufficient quantity of the blown metal to produce the desired product, adding reducing agents to the slag in the second furnace sufficient to deoxidize the chromium in the slag.

2. The process of claim 1 applied to high manganese chrome irons, removing the first converter slag containing the major portion of the manganese, and continuing the process as stated in claim 1.

3. The process of producing high chrome steel which consists in blowing chrome iron under basic conditions to a point where most of the chromium is accumulated in a basic slag containing chromium oxides, electrically heating under basic conditions a charge comprising the converter slag and a sufficient quantity of the blown metal to produce the desired product and adding reducing agents to the slag undergoing electric heating sufficient to deoxidize the chromium in the slag.

LEWIS B. LINDEMUTH.